Patented Sept. 14, 1943

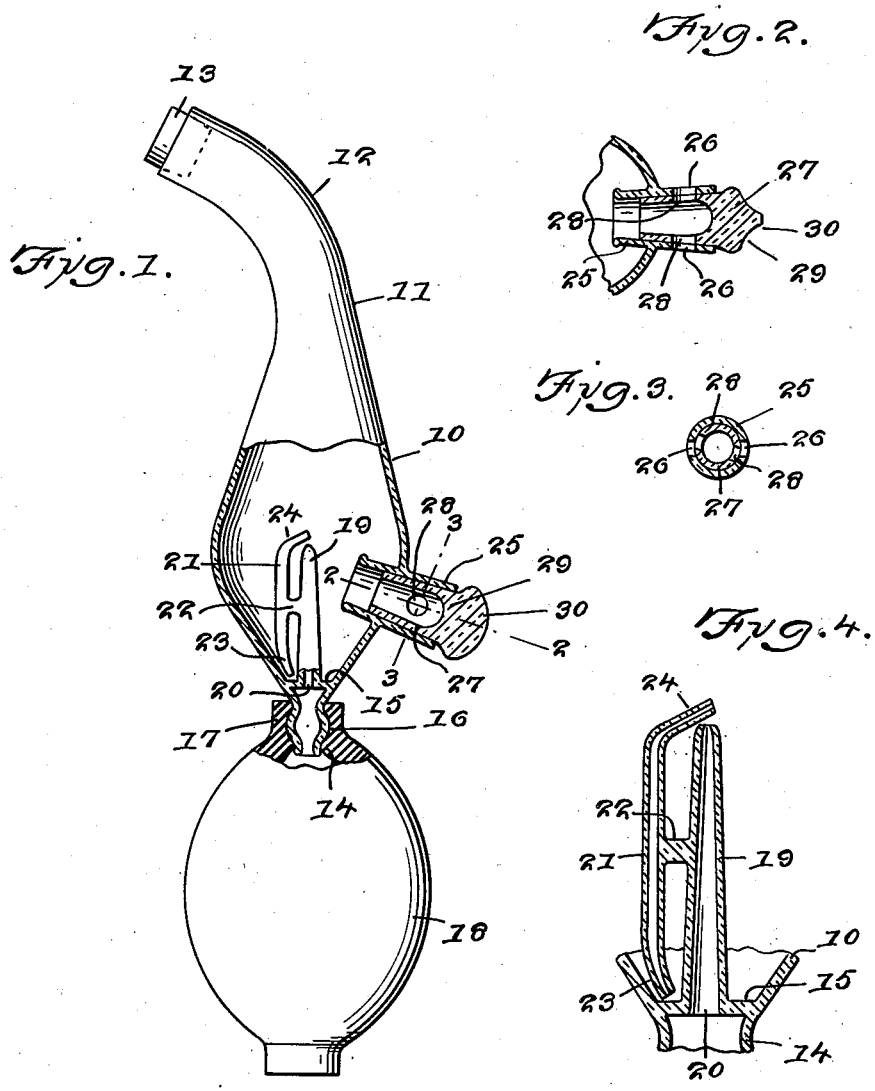

2,329,506

UNITED STATES PATENT OFFICE 2,329,506

VAPORIZER

Elwood R. Ailes, Johnstown, Pa.

Application October 4, 1941, Serial No. 413,688

1 Claim. (Cl. 299—88.5)

This invention relates to a vaporizer of the type used in the treatment of diseases of the respiratory tract and has for an object to provide a device of this character which will mechanically convert any suitable liquid medicament into a vapor form, the volume and mixture of which is self-adjustable as to various requirements.

A further object is to provide a vaporizer in which the lower end of the siphon tube is tapered and functions as a check valve to hold the liquid in the tube.

A further object is to provide a device of this character having a valve plunger mounted in a seat in the liquid container adapted to be adjusted to control the amount of air admitted to the container.

A further object is to provide apparatus of this character which will be formed of a few strong, simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claim without departing from the spirit or sacrificing any of the advantages of the invention.

In the accompanying drawing forming a part of this specification:

Figure 1 is a side elevation of a vaporizer constructed in accordance with the invention, with parts broken away to expose the air spout, the siphon tube, and valve plunger.

Figure 2 is a longitudinal sectional view of the valve plunger taken on the line 2—2 of Figure 1.

Figure 3 is a cross sectional view of the valve plunger taken on the line 3—3 of Figure 1.

Figure 4 is a longitudinal sectional view showing the air spout and the siphon tube.

Referring now to the drawing in which like characters of reference designate similar parts in the various views, 10 designates a glass container which is somewhat in the nature of a streamlined ball in contour and narrows down, funnel-like as shown at 11 to terminate in a curved mouth tube 12 through which the container is filled with liquid medicament. A cork 13 closes the mouth tube. An air supply spout 14 extends downwardly from the bottom 15 of the container and is provided with a bulge 16 which releasably anchors the air spout in the open end 17 of a rubber bulb 18.

A glass air spout 19 is formed integral with the bottom 15 of the container and the bore of the spout communicates with the air spout 14 through an opening 20. The air spout extends axially in the container and tapers toward its upper or outlet end.

A siphon tube 21 extends longitudinally of the air spout 19 and is connected intermediate its ends to the air spout by the integral glass bar 22. The siphon tube is tapered at the lower end 23 and is also tapered at the upper end 24, and the latter end overlies and is spaced from the outlet end of the air spout 19. The tapering lower end 23 of the siphon tube extends nearly to the bottom of the container and functions as a check valve to hold the liquid in the siphon tube to the level of the top of the air spout so that the liquid is always at a point to be sucked into the air stream from the air spout when the bulb is squeezed. The upper end 24 of the siphon tube extends at an angle of about thirty degrees to the axis of the siphon tube. The purpose of this is to reduce the trailing edge of the liquid emerging from the siphon tube with the result that the forming of large drops is prevented. The tapered upper end 24 of the siphon tube serves to limit the necessary supply of liquid to be fed to the air spout which in turn blows it against the wall of the glass container 10 to convert the liquid into vapor.

A tubular valve seat 25 is formed in the wall of the container near the bottom thereof and the seat opens toward the discharge end of the air spout 19 to supply air from the atmosphere to the interior of the container. The axis of the valve seat extends at an angle of about thirty degrees to the horizontal. As best shown in Figure 2 the valve seat is provided with diametrically opposite openings 26.

A rubber valve plunger 27 is disposed in the valve seat and is provided with oppositely disposed openings 28. The inner end of the valve plunger is open and the outer end is closed by a wall 29 having a flattened integral portion forming a hand grip 30 which may be turned to dispose the openings 28 in the valve plunger into complete or part registration with the openings in the valve seat to control the supply of atmospheric air admitted through the valve seat to the container. When the openings of the plunger valve are in registration with the openings in the valve seat it may be said that the draft control is wide open. When the openings in the valve plunger are in part registration with the openings in the valve seat the volume of atmospheric air entering the container is decreased. When the valve plunger is wide open the vapor pressure and density is at its highest volume and when the valve is adjusted to less than wide open position the vapor volume and density is diminished accordingly.

Since the operation of the parts has been described as the description of the parts progressed it is thought the invention will be fully understood without further explanation.

What is claimed is:

An atomizer containing a liquid container having a vapor outlet, a siphon tube in the container having a tapered inlet end disposed in the liquid and forming a check valve to retain liquid in the tube to a predetermined height, an air spout in the container having the outlet and terminating in atomizing relation to the outlet end of the siphon tube, means connected to the intake end of the air spout for forcing air under pressure from the spout in the path of liquid drawn from the siphon tube, a tubular seat in the wall of the container terminating near the outlet end of the air spout, there being oppositely disposed air intake openings in the seat externally of the container, and a tubular valve plunger closed at the outer end and open at the inner end rotatably mounted in said seat, the plunger having oppositely disposed openings adapted to cooperate with the air intake openings in the seat.

ELWOOD R. AILES.